US012580262B2

(12) United States Patent
Bai et al.

(10) Patent No.: US 12,580,262 B2
(45) Date of Patent: Mar. 17, 2026

(54) BATTERY MODULE AND ELECTRONIC DEVICE

(71) Applicant: AESC Japan Ltd., Kanagawa (JP)

(72) Inventors: Yulong Bai, Jiangsu (CN); Zhiqi Song, Jiangsu (CN); Fangkai Fu, Jiangsu (CN); Yafei He, Jiangsu (CN)

(73) Assignee: AESC Japan Ltd., Kanagawa (JP)

( * ) Notice: Subject to any disclaimer, the term of this patent is extended or adjusted under 35 U.S.C. 154(b) by 607 days.

(21) Appl. No.: 18/084,567

(22) Filed: Dec. 20, 2022

(65) Prior Publication Data

US 2023/0395918 A1 Dec. 7, 2023

(30) Foreign Application Priority Data

Jun. 2, 2022 (CN) .......................... 202210626340.X
Sep. 28, 2022 (CN) .......................... 202211193718.8

(51) Int. Cl.
*H01M 50/242* (2021.01)
*H01M 50/209* (2021.01)
*H01M 50/264* (2021.01)

(52) U.S. Cl.
CPC ....... *H01M 50/242* (2021.01); *H01M 50/209* (2021.01); *H01M 50/264* (2021.01)

(58) Field of Classification Search
CPC ............. H01M 50/209; H01M 50/242; H01M 50/244; H01M 50/264
See application file for complete search history.

(56) References Cited

U.S. PATENT DOCUMENTS

2016/0133892 A1 5/2016 Uhm et al.
2020/0350538 A1 11/2020 Jeon

FOREIGN PATENT DOCUMENTS

CN 209104213 7/2019
CN 115117533 9/2022
CN 219267825 U * 6/2023 .......... H01M 50/244

OTHER PUBLICATIONS

"Search Report of Europe Counterpart Application", issued on Dec. 7, 2023, p. 1-p. 8.
"Office Action of China Counterpart Application", issued on Oct. 27, 2023, with English translation thereof, p. 1-p. 13.
"Office Action of China Counterpart Application", issued on Mar. 19, 2024, with English translation thereof, p. 1-p. 12.
"Office Action of China Counterpart Application", issued on May 16, 2024, with English translation thereof, p. 1-p. 14.
"Office Action of Japan Counterpart Application", issued on Apr. 10, 2024, with English translation thereof, p. 1-p. 6.

* cited by examiner

*Primary Examiner* — Jonathan G Jelsma
(74) *Attorney, Agent, or Firm* — JCIPRNET

(57) ABSTRACT

A battery module and an electronic device are provided. The battery module includes a case and a cell. Multiple cells are stacked in the case along a thickness direction. The case includes a base plate, an upper cover, and a side wall. The side wall is formed by enclosing multiple side plates. The side plates include at least one movable plate capable of sliding along a stacking direction of the cells. When the cell swells, an swelling force and an swelling amount of the cell pushes the outermost cell to move toward the stacking direction, so that the movable plate is pushed and slides along with the swelling of the cell, which can reduce the swelling force on the movable plate to effectively reduce the swelling force on the movable plate in an swelling direction of the cell, so as to significantly improve the safety of the battery module.

9 Claims, 10 Drawing Sheets

BATTERY MODULE AND ELECTRONIC DEVICE

CROSS-REFERENCE TO RELATED APPLICATION

This application claims the priority benefit of China Application No. 202210626340.X, filed on Jun. 2, 2022 and China Application No. 202211193718.8, filed on Sep. 28, 2022. The entirety of each of the above-mentioned patent applications is hereby incorporated by reference herein and made a part of this specification.

BACKGROUND

Technical Field

The disclosure relates to the technical field of batteries, and in particular to a battery module and an electronic device.

Description of Related Art

As the core of the three key technologies of new energy vehicles, power batteries are receiving more and more attention. Safety is a critical technical aspect for batteries. As a characteristic of the material of the power battery, gas will be generated inside the cell of the battery core regardless of under normal charge and discharge conditions or after the battery experiences thermal runaway or aging, which causes the cell to swell, such that other structures inside the power battery device are deformed, thereby resulting in various safety risks.

In order to solve such issue, all-solid-state batteries are being vigorously promoted. Although not using liquid can significantly improve the safety of the battery device, in the all-solid-state battery, the swelling amount and the swelling force of the cell of the module are still very large, and the cell may still unavoidably swell. When the cell heats up and swells, all the swelling amount of the internal cell is transferred and accumulated at the outermost cell inside the module, and the accumulated swelling amount generates a large thrust on the side plate of the module. It is difficult for the traditional structure of the side plate to completely bear the strength of such thrust, so the side plate may be easily deformed, cracked, or even broken.

Therefore, there is an urgent need for a battery module to solve the above issue.

SUMMARY

One objective of the disclosure is to provide a battery module, which can reduce the swelling force of a cell on a side plate to improve the safety of the battery module.

Another objective of the disclosure is to provide an electronic device. Through applying the battery module, the performance of the battery module is stable to improve the safety of the electronic device.

To achieve the above objectives, the following technical solutions are provided.

In a first aspect, a battery module is provided, which includes the following.

A case includes a base plate, an upper cover, and a sidewall.

Multiple cells are stacked in the case along a thickness direction thereof.

The side wall is formed by enclosing multiple side plates. The side plates include at least one movable plate capable of sliding along a stacking direction of the cells.

As an optional solution of the battery module, the battery module further includes a cable tie. The cable tie is disposed to be at least elastically attached to an outer surface of the movable plate and a part of two side plates adjacent left and right to the movable plate.

As an optional solution of the battery module, two ends of the cable tie are respectively provided with connecting portions. The connecting portions of multiple cable ties are connected two by two and/or are fixed to the two side plates adjacent left and right to the movable plate.

As an optional solution of the battery module, the two side plates adjacent left and right to the movable plate are fixed plates. The fixed plates are fixedly connected to the base plate and the upper cover.

As an optional solution of the battery module, the fixed plate is provided with an escape groove for the cable tie to pass through, so that the cable tie slides in the escape groove along with a deformation and/or a displacement thereof.

As an optional solution of the battery module, the fixed plate is provided with a recess for the connecting portion to be embedded.

As an optional solution of the battery module, multiple cable ties include a first cable tie and a second cable tie. A first connecting portion of the first cable tie is elastically connected to a second connecting portion of the second cable tie.

As an optional solution of the battery module, the first connecting portion includes a body and an elastic member, and the second connecting portion includes a fixed portion and a limiting guiding member. The limiting guiding member is connected to the fixed portion, the limiting guiding member is slidably disposed on the body along the stacking direction of the cells, and two ends of the elastic member are respectively connected to the body and the limiting guiding member.

As an optional solution of the battery module, the body is provided with an accommodating groove extending along the stacking direction of the cells. Two opposite groove walls of the accommodating groove are both provided with limiting guiding grooves extending along the stacking direction of the cells. The elastic member is accommodated in the accommodating groove. Two ends of the limiting guiding member are respectively slidably matched with the limiting guiding grooves on the two groove walls of the accommodating groove.

As an optional solution of the battery module, the elastic member is stretched and connected between the body and the limiting guiding member.

As an optional solution of the battery module, one end of the elastic member is connected to a side wall of the accommodating groove away from the second cable tie, and other end of the elastic member is connected to the limiting guiding member.

As an optional solution of the battery module, the elastic member is compressed and connected between the body and the limiting guiding member.

As an optional solution of the battery module, the second connecting portion further includes a connecting member. The connecting member is connected between the fixed portion and the limiting guiding member. One end of the elastic member is connected to a side wall of the accommodating groove close to the second cable tie, and other end of the elastic member is connected to the limiting guiding member.

As an optional solution of the battery module, the case further includes a sliding track and a sliding groove. The sliding groove is disposed on the movable plate, and the sliding track is disposed on the base plate and/or the upper cover.

As an optional solution of the battery module, the sliding track is a strip-shaped protrusion extending along the stacking direction of the cells, and the sliding groove is a notch structure matching with the strip-shaped protrusion of the sliding track.

As an optional solution of the battery module, an extension length of the sliding track is equal to or more than an swelling amount of the cell in the thickness direction.

As an optional solution of the battery module, a width of the base plate is L, and a length of the sliding track is x, then x/L<0.15.

In a second aspect, an electronic device is provided, which includes the battery module.

Compared with the prior art, the beneficial effects of the disclosure are as follows.

The battery module provided by the disclosure includes the case and the cell. The cells are stacked in the case. The case includes the base plate, the upper cover, and the sidewall. The side wall is formed by enclosing the side plates. The side plates include at least one movable plate capable of sliding along the stacking direction of the cells. When the cell swells, the swelled cell pushes and displaces the adjacent cell due to the increased volume thereof. After the displacement is transferred to the outermost cell, the pushed outermost cell eventually exerts an outward extrusion force on the sidewall. Since at least one side wall of the disclosure is the movable plate, the movable plate can slide outward along the stacking direction of the cells after experiencing the extrusion force from the cell, which eliminates the rigid stress that needs to be borne by the side wall and reduces the risk of component damage due to hard extrusion to significantly improve the safety of the battery module.

In the electronic device provided by the disclosure, through applying the battery module, the performance of the battery module is stable to improve the safety of the electronic device.

DETAILED DESCRIPTION OF DISCLOSED EMBODIMENTS

Figure 1:
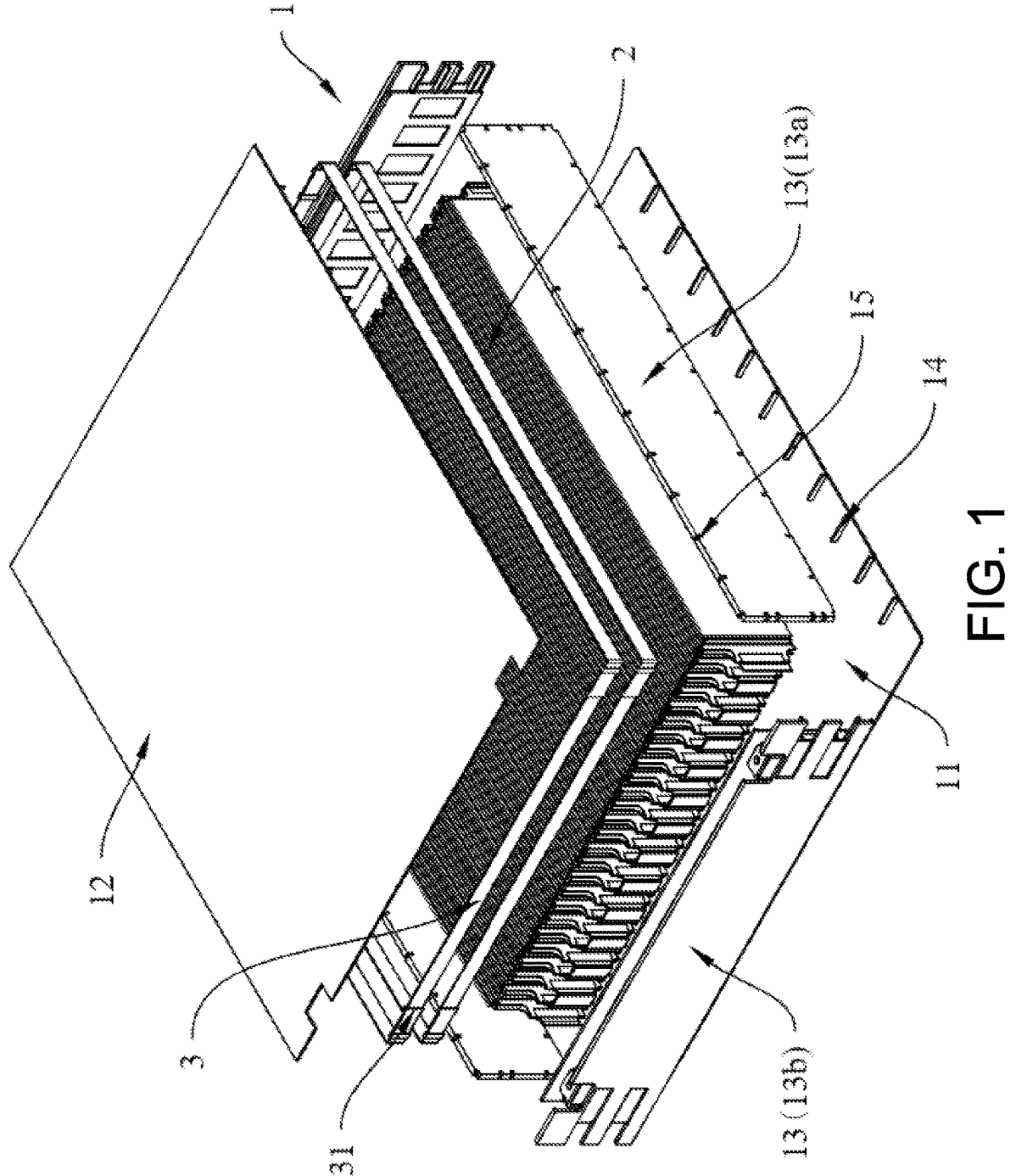
FIG. 1 is an exploded schematic view of a battery module according to an embodiment of the disclosure.

In order for the objectives, technical solutions, and advantages of the embodiments of the disclosure to be clearer, the technical solutions in the embodiments of the disclosure will be clearly and completely described below with reference to the drawings in the embodiments of the disclosure. Obviously, the described embodiments are some embodiments of the disclosure, but not all embodiments. Components of the embodiments of the disclosure generally described and illustrated in the drawings herein may be arranged and designed in various different configurations.

Therefore, the following detailed description of the embodiments of the disclosure provided in the drawings is not intended to limit the protection scope of the disclosure, but is merely representative of selected embodiments of the disclosure. Based on the embodiments of the disclosure, all other embodiments obtained by persons skilled in the art without creative efforts shall fall within the protection scope of the disclosure.

It should be noted that similar reference numerals and letters refer to similar items in the following drawings, so once a certain item is defined in a drawing, the item does not need to be further defined and explained in subsequent drawings.

In the description of the disclosure, it should be noted that terms such as "upper", "lower", "left", "right", "vertical", "horizontal", "inner", and "outer", that indicate the orientation or positional relationship are based on the orientation or positional relationship shown in the drawings or the conventional placement orientation or positional relationship of the product of the disclosure when used. The terms are only for the convenience of describing the disclosure and simplifying the description, rather than indicating or implying that the referred device or elements must have a particular orientation or be constructed and operated in the particular orientation. Therefore, the terms should not be construed as limiting the disclosure. Furthermore, terms such as "first", "second", and "third" are only used to differentiate description and should not be construed to indicate or imply relative importance. In the description of the disclosure, unless otherwise specified, "plurality" means two or more.

In the description of the disclosure, it should also be noted that unless otherwise expressly specified and limited, the terms "configuration" and "connection" should be understood in a broad sense. For example, connection may be a fixed connection, a detachable connection, or an integral connection; or may be a mechanical connection or an electrical connection. For persons skilled in the art, the specific meanings of the above terms in the disclosure can be understood in specific situations.

In the disclosure, unless otherwise expressly specified and limited, a first feature being "on" or "under" a second feature may include direct contact between the first and second features or may include that the first and second features are not in direct contact but are in contact through another feature between them. Also, the first feature being "on", "above", and "on top of" the second feature includes the first feature being directly above and diagonally above the second feature or simply indicating that the first feature is horizontally higher than the second feature. The first feature being "under", "below", and "at the bottom of" the second feature includes the first feature being directly below and diagonally below the second feature or simply indicating that the first feature is horizontally lower than the second feature.

The following describes in detail the embodiments of the disclosure, examples of the embodiments are illustrated in the drawings, wherein the same or similar reference numerals refer to the same or similar elements or elements having the same or similar functions throughout. The embodiments described below with reference to the drawings are exemplary, are only used to explain the disclosure, and should not be construed as a limitation to the disclosure.

FIG. 1 shows a basic structure of a battery module according to an embodiment of the disclosure. As shown in FIG. 1, the battery module of the embodiment of the disclosure has a case 1. The case 1 includes a base plate 11, an upper cover 12, and a side wall. The side wall is formed by enclosing multiple side plates 13. As shown in FIG. 1, in the embodiment, there are four side plates 13 to form a rectangular box shape. Persons skilled in the art may also adjust the number and the size of the side plates 13 according to the actual situation. Multiple cells 2 are disposed inside the case 1. The cell 2 is a substantially rectangular package and is placed in contact with the base plate 11 in a thickness direction thereof. The cells 2 are stacked in the case 1 along the thickness direction. The side plates 13 include at least one movable plate 13a that can slide along a stacking direction of the cells 2. When the cell 2 swells, a thrust generated by the swelling of the cell 2 pushes the outermost cell 2 to move toward the stacking direction, and the movable plate 13a is also pushed and slides along with an swelling amount of the cell 2 via the outermost cell 2. The thrust generated by the swelling of the cell is converted into a sliding kinetic energy of the movable plate 13a, which reduces a rigid thrust that needs to be borne by the movable plate 13a to significantly improve the safety of the battery module.

In the above embodiment of the disclosure, the two side plates 13 adjacent left and right to the movable plate 13a are fixed plates 13b, and the fixed plates 13b are fixedly connected to the base plate 11 and the upper cover 12. The two fixed plates 13b are perpendicular to a length direction of the cell 2 (not shown in the drawing), the two movable plates 13a are disposed in the stacking direction of the cells 2, and the two movable plates 13a may both slide outward along the stacking direction of the cells 2. However, in other embodiments, only one movable plate 13a may slide or all side plates 13 may be set to be movable, as long as at least one side plate 13 can slide along the stacking direction of the cells 2. Here, no further examples are illustrated one by one.

A sliding groove 15 is also disposed on the movable plate 13a, while a sliding track 14 is disposed on the base plate 11 corresponding to a sliding range of the movable plate 13a, the upper cover 12, and one end of the fixed plate 13b. Through the matching structure between the sliding track 14 and the sliding groove 15, the movable plate 13a can be displaced along an swelling direction of the cell in a state of always being perpendicular to the adjacent fixed plate 13b without lateral displacement, skewness, etc., so as to maintain the structural integrity of the case 1 of the battery module.

In addition, a cable tie 3 is disposed on an outer periphery of the side wall. At least part of the cable tie 3 is made of an elastic material. The objective of disposing the cable tie 3 is to apply an elastic force opposite to the sliding direction onto the movable plate 13a using characteristics of the elastic material when the movable plate 13a slides outward due to the thrust of the swelling of the cell 2 to prevent the movable plate 13a from continuing to be displaced outward, so as to maintain the structural stability of the battery module.

The structures of the sliding groove 15, the sliding track 14, and the cable tie 3 will be described in further detail below.

Figure 2:
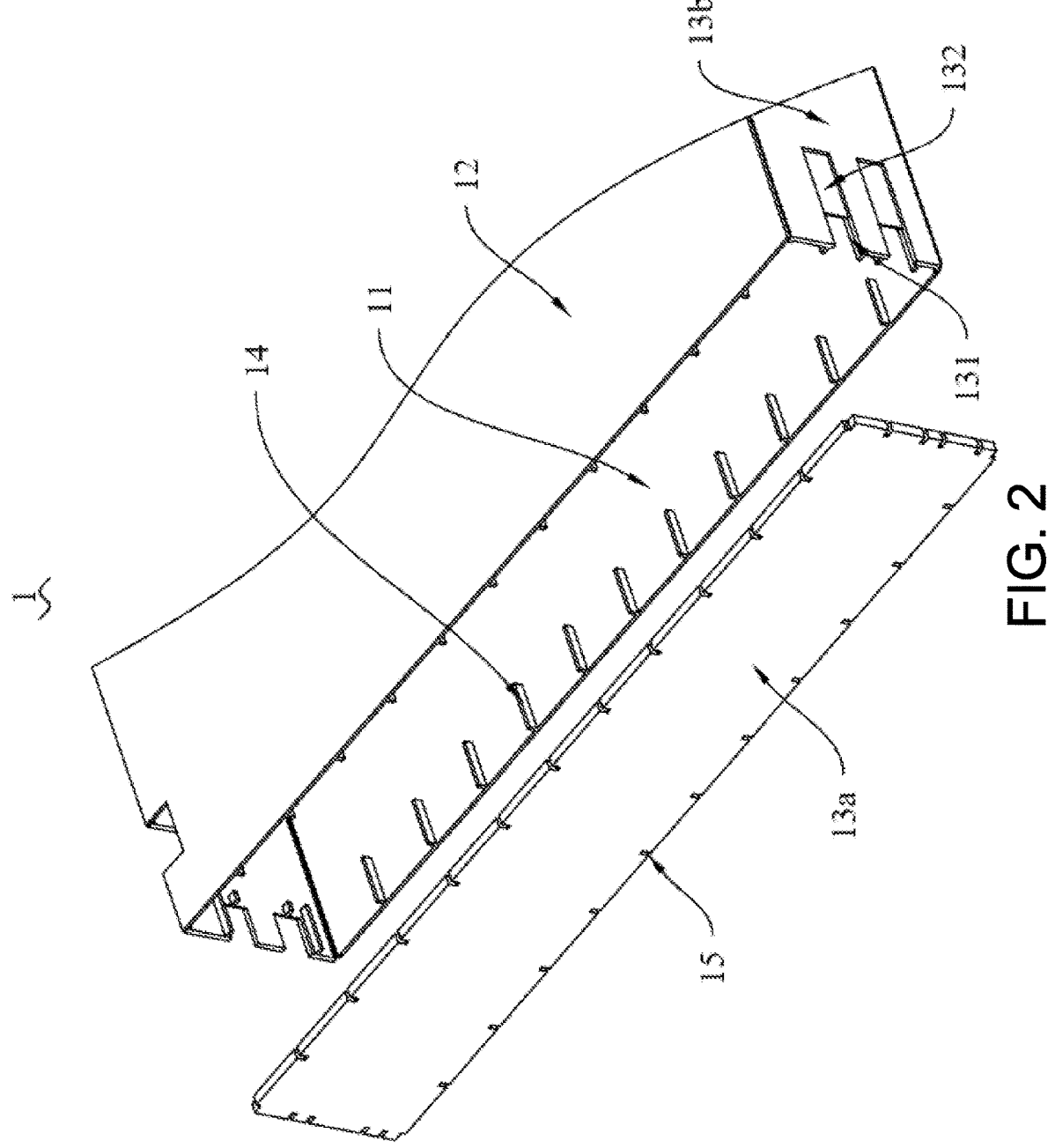
FIG. 2 is a schematic structural view of a sliding track and a sliding groove according to an embodiment of the disclosure.

As shown in FIG. 2, the base plate 11, the upper cover 12, and the fixed plate 13b are all provided with the sliding track 14, and a peripheral side of the movable plate 13a is correspondingly provided with a sliding groove 15. In other embodiments, the sliding track 14 may also be disposed at any one or more positions of the base plate 11, the upper cover 12, or the fixed plate 13b, and the sliding groove 15 is only disposed at the corresponding position of the movable plate 13a. The sliding track 14 is a strip-shaped protrusion extending along the stacking direction of the cells 2, and the sliding groove 15 is a notch structure matching with the strip-shaped protrusion of the sliding track 14. Such design is convenient for the processing of the sliding track 14 and the sliding groove 15, while minimizing the increase in the amount of material used for the case 1, and implementing the lightweight of the case 1. Self-evidently, it is also possible to set the sliding track to be a recess and correspondingly set the sliding groove to be a protrusion.

In order to ensure that the movable plate 13a is not separated from the fixed plate 13b, an extension length of the sliding track 14 should not be less than the swelling amount of the cell 2 in the thickness direction. Specifically, the length of the sliding track 14 is preferably the difference between the thickness of a fully swelled cell stack and the thickness in the initial state. At the same time, it is also necessary to consider a compression ratio, etc. of a buffer component disposed inside the module and between the cells 2. The design length of the sliding track 14 may be briefly expressed by Formula (1) below.

$$X = nRT_{cell} - \Delta CT_{buffer} \tag{1}$$

where x is the length of the sliding track 14, n is the number of the cells 2, R is the swelling ratio of the cell 2, $T_{cell}$ is the thickness of a single cell 2, $T_{buffer}$ is the thickness of the buffer component in the module, $\Delta C$ is the amount of change in the compression ratio of a buffer substance before and after the swelling of the cell 2.

In a preferred case, the width of the base plate 11 is the final width after the swelling of the cell 2, which can further ensure that the movable plate 13a does not slip off from the sliding track 14. In the actual design, if the width of the base plate 11 is set to L, and the length of the sliding track 14 is x, then x/L<0.15.

As shown in FIG. 2, an escape groove 131 is further disposed at an end portion of the fixed plate 13b. At least a section of the escape groove 131 close to the end portion of the fixed plate 13b is a rectangular opening penetrating the fixed plate 13b, and the width thereof may allow the cable tie 3 to pass through. The fixed plate 13b may also be provided with a recess 132 that does not penetrate the plate, and the width thereof also matches the width of the cable tie 3. The recess 132 and the escape groove 131 both extend along a length direction of the fixed plate 13b. FIG. 2 shows the manner in which the two are connected along the length direction at the end portion of the fixed plate 13b, but the two may also be disposed at an interval.

Figure 3:
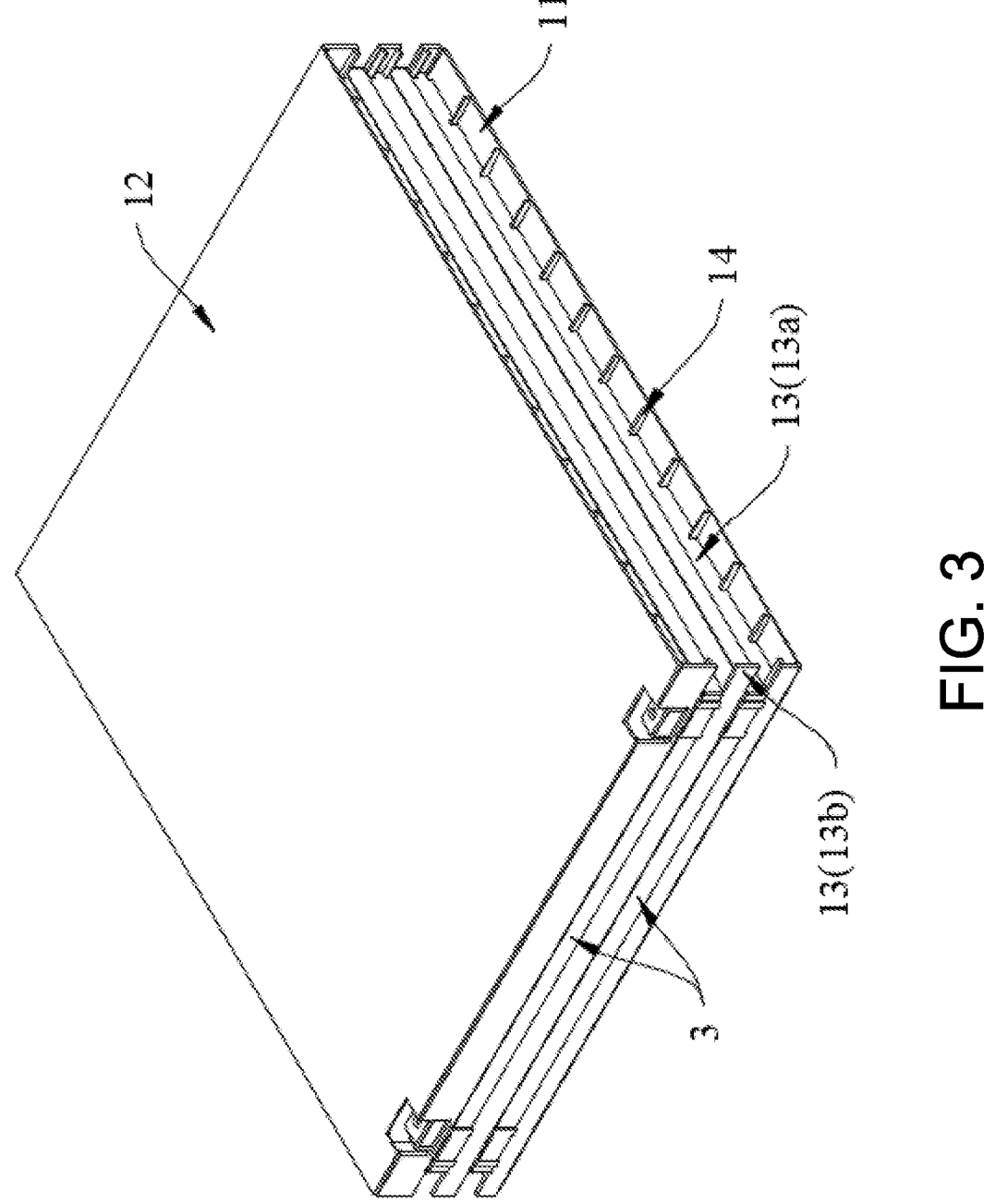
FIG. 3 is a schematic structural view of a battery module before a cell swells according to an embodiment of the disclosure.
Figure 4:
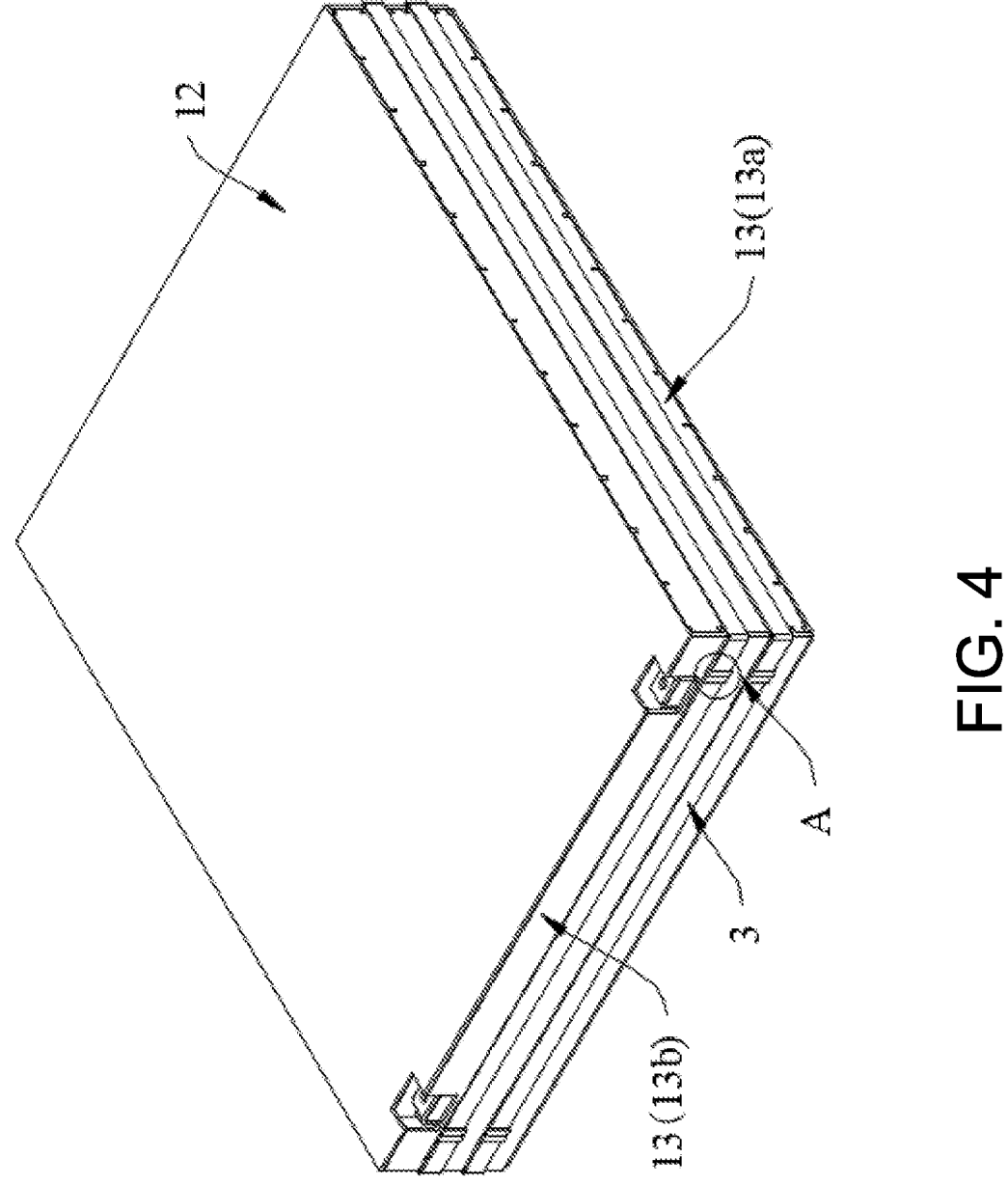
FIG. 4 is a schematic structural view of a battery module after a cell swells according to an embodiment of the disclosure.

FIG. 3 shows a schematic structural view of a battery module before swelling according to the embodiment of the disclosure. FIG. 4 shows a schematic structural view of a battery module after swelling according to an embodiment of the disclosure. As shown in FIG. 3, before the cell 2 of the module swells, the cells 2 in the module are compactly arranged and the overall volume is small. The movable plate 13a is embedded inside the case 1 of the battery module in a manner that matches the compact volume, so that the upper cover 12, a lower plate, and the end portion of the fixed plate 13b, more specifically, a part of the components provided with a part of the sliding track 14 is not in contact with the movable plate 13a and is exposed outside the space of the module. It should be noted that in such state, the escape groove 131 disposed at the end portion of the fixed plate 13b is also located on an outer side of the case 1 formed by enclosing the current movable plate 13a. The cable tie 3 disposed on the outer periphery of the side wall of the battery module passes through the escape groove 131 to relatively fix the fixed plate 13b and the movable plate 13a in a mutually perpendicular manner.

In the case of the swelling of the cell 2 of the module as shown in FIG. 4, under the action of the swelling force of the cell 2, the movable plate 13a experiences the internal thrust to be pushed outward and to slide along the sliding track 14, while also stretching and tensioning the cable tie 3 to generate an elastic force opposite to the sliding direction on the movable plate 13a, so as to prevent the movable plate 13a from continuing to slide. The ultimate elastic force of the cable tie 3 is set, so that the movable plate 13a can eventually be aligned and abutted with the upper cover 12 and the end portion of the base plate 11 without slipping off from the sliding track 14.

Figure 5:
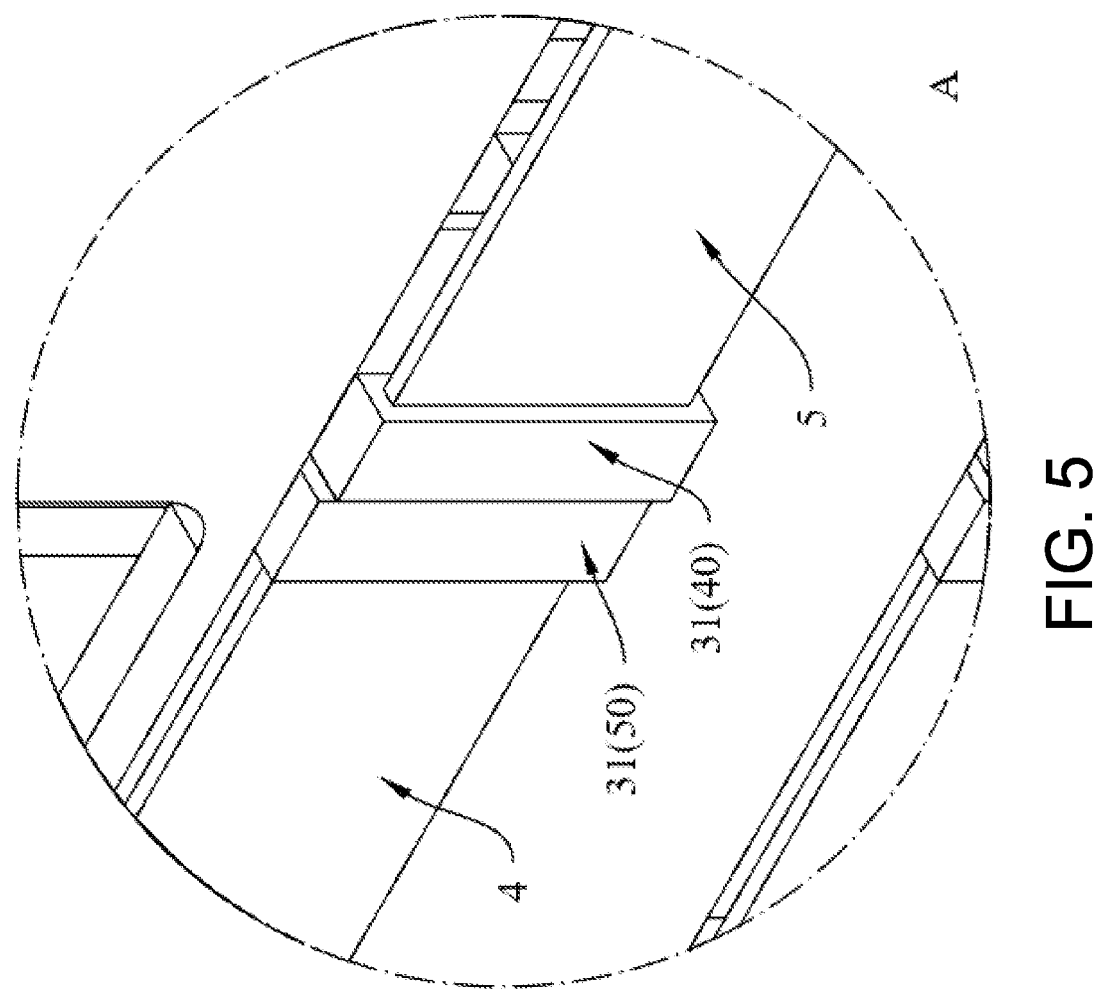
FIG. 5 is an enlarged view at A in FIG. 4.
Figure 6:
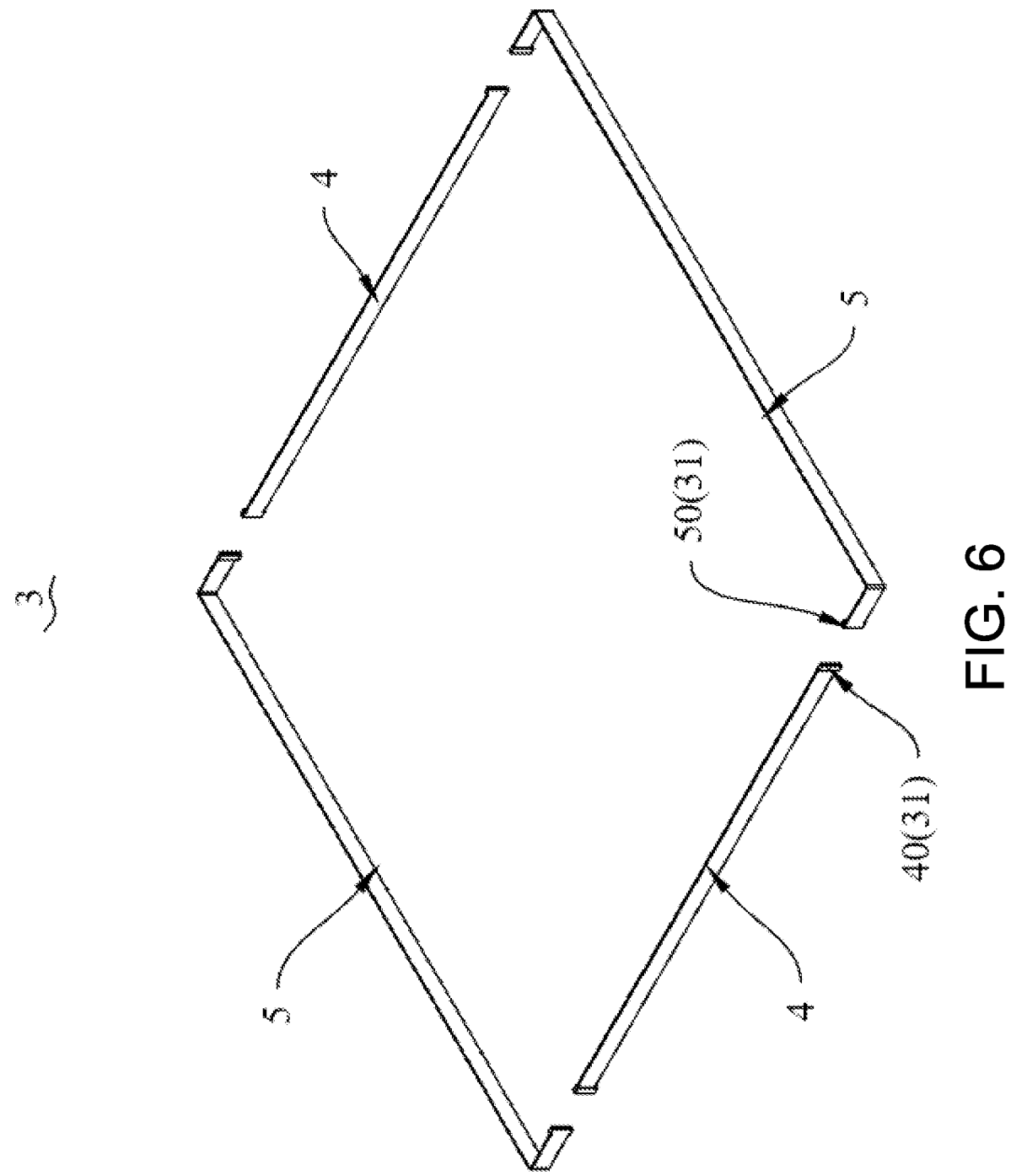
FIG. 6 is a schematic structural view of a first cable tie according to an embodiment of the disclosure.

FIG. 5 and FIG. 6 show a first example of the basic structure of the cable tie 3. As shown in FIG. 5 and FIG. 6, the cable tie 3 is formed by joining multiple sections of a rope-shaped component, and two ends of each section of the cable tie 3 are both provided with a connecting portion 31. The connecting portions 31 are connected two by two to combine multiple sections of the cable tie 3 into a ring shape, thereby surrounding the peripheral side of the side wall, so as to ensure that the movable plate 13a slides relative to the fixed plate 13b along the thickness direction of the cell 2 within the range of the length of the sliding track 14. For example, as shown in FIG. 6, the cable tie 3 includes a first cable tie 4 and a second cable tie 5. Two ends of the first cable tie 4 are provided with a first connecting portion 40, and two ends of the second cable tie 5 are provided with a second connecting portion 50. The two first cable ties 4 and the two second cable ties 5 are alternately connected and surround the peripheral side of the side wall. Here, the second cable tie 5 attached to the movable plate 13a has a certain elasticity, while the first cable tie 4 not attached to the movable plate 13a may have the same elasticity as the second cable tie 5, a lower elasticity, or even no elasticity. In other embodiments, the cable tie 3 may also be a ring-shaped elastic member without a connecting portion and directly surround the peripheral side of the side wall of the case 1. In other embodiments, the cable tie 3 may also be a cord with two free ends instead of forming the ring shape. The long tie-shaped cable tie 3 may be elastically attached to only an outer surface of the movable plate 13a, while the connecting portions 31 at two ends thereof are fixed on the two side plates 13 adjacent left and right to the movable plate 13a (the two fixed plates 13b in this embodiment). In other words, as long as the cable tie 3 is disposed to be at least elastically attached to a part of the outer surface of the movable plate 13a and the two side plates 13 adjacent left and right to the movable plate 13a, the technical effects to be achieved by the disclosure can be achieved. The technical effects are as follows. When the cell 2 does not swell, a supporting force for positioning is generated on the movable plate 13a, and when the movable plate 13a is displaced, a restraining force to obstruct continuous sliding can be generated, so as to ensured that the movable plate 13a is eventually abutted with the upper cover 12, the base plate 11, and other side walls and does not slip off.

In the case where the cable tie 3 is provided with the connecting portion 31, the connecting portion 31 of the cable tie 3 is preferably clamped in the recess 132. Since the thickness of the connecting portion 31 is greater than the cable tie 3, clamping the connecting portion 31 in the recess 132 enables the cable tie 3 to be evenly attached to the side wall, so as to ensure the tightening effect of the cable tie 3. Also, clamping the connecting portion 31 in the recess 132 correspondingly enables a part of the cable tie 3 near the connecting portion 31 to be also kept in the recess 132, which plays a role in positioning the cable tie 3 to prevent displacement of the cable tie 3 due to the movement of the elastic force during the process of extension or retraction, so as to ensure the integrity of the case 1 of the battery module.

Figure 7:
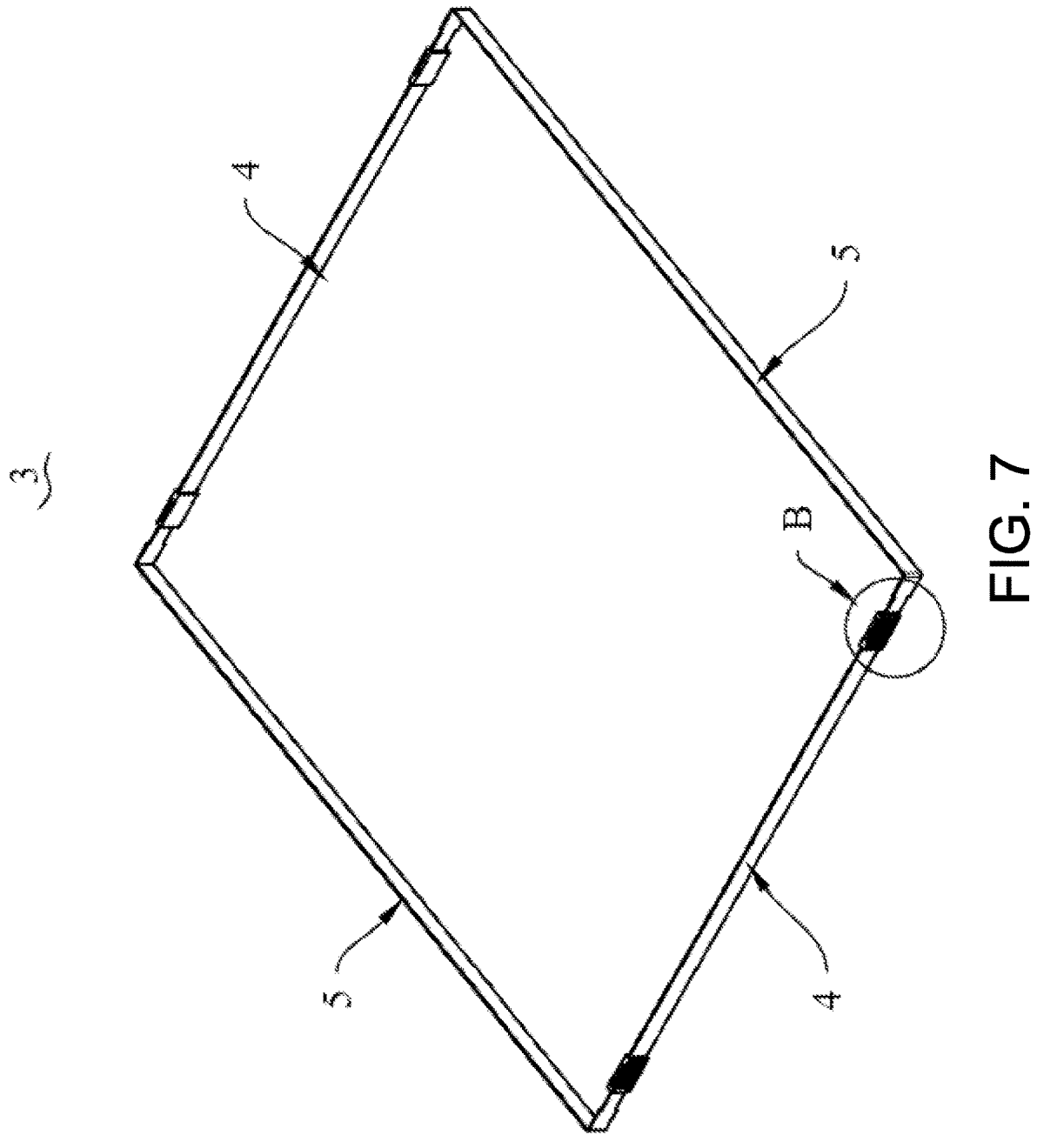
FIG. 7 is a schematic structural view of a second cable tie according to an embodiment of the disclosure.
Figure 8:
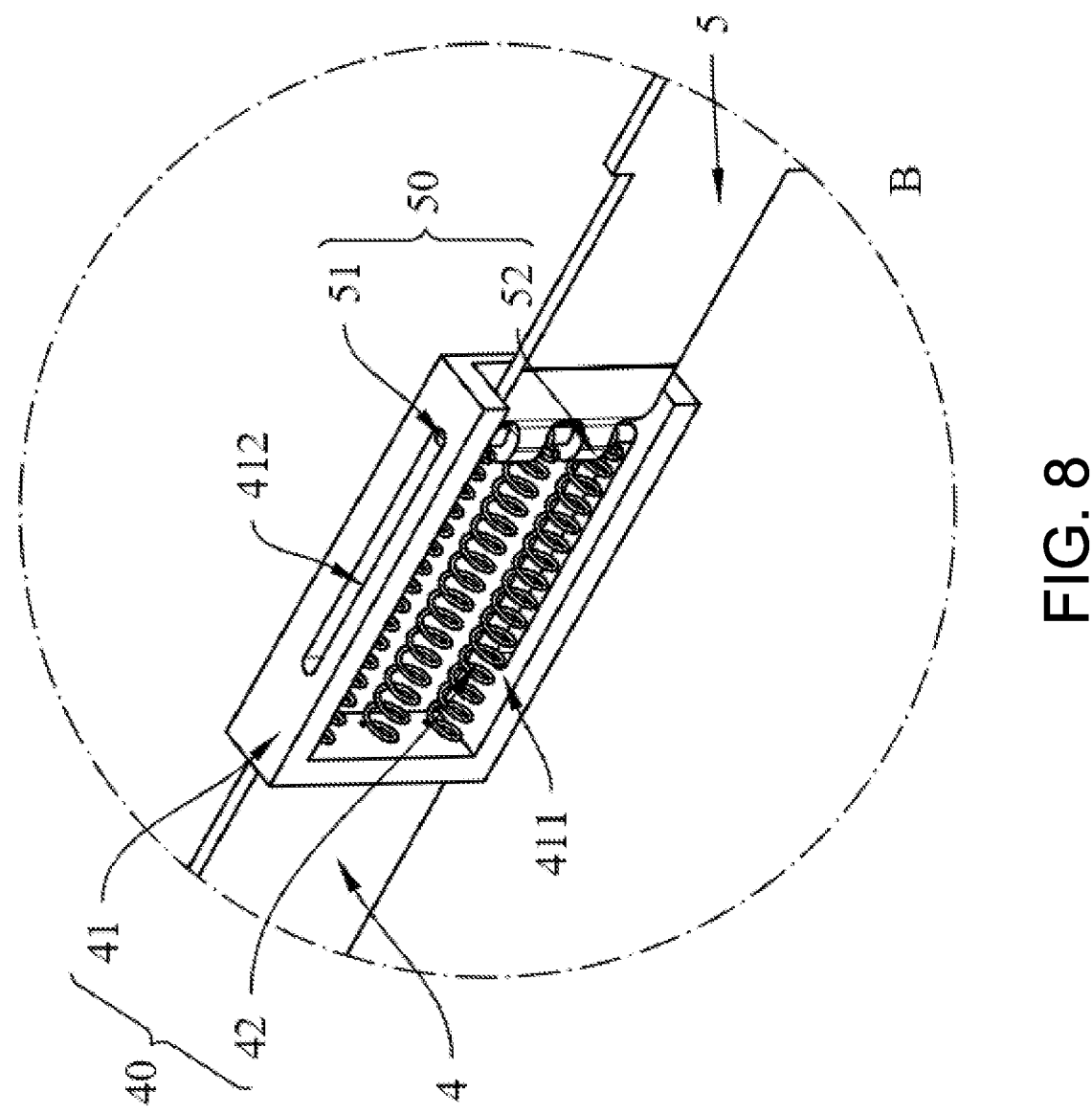
FIG. 8 is an enlarged view at B in FIG. 7.

FIG. 7 and FIG. 8 show a second example of the basic structure of the cable tie 3. As shown in FIG. 7 and FIG. 8, the cable tie 3 includes the first cable tie 4 and the second cable tie 5. The two ends of the first cable tie 4 are provided with the first connecting portion 40, and the two ends of the second cable tie 5 are provided with the second connecting portion 50. The two first cable ties 4 and the two second cable ties 5 are alternately connected and surround the peripheral side of the side wall. In another embodiment, in the cable tie 3, the number of the first cable tie 4 and the second cable tie 5 is at least two, and the first cable tie 4 and the second cable tie 5 are alternately connected and surround the peripheral side of the side wall. The first connecting portion 40 of the first cable tie 4 is elastically connected to the second connecting portion 50 of the second cable tie 5. When the cell 2 does not swell, the first cable tie 4 and the second cable tie 5 can generate a supporting force for positioning on the movable plate 13a. When the cell 2 swells to move the movable plate 13a, the first cable tie 4 and the second cable tie 5 can exert a restraining force on the movable plate 13a to obstruct continuous sliding, so as to ensure that the movable plate 13a is eventually abutted with the upper cover 12, the base plate 11, and other side walls and does not slip off.

Continuing as shown in FIG. 8, the first connecting portion 40 includes a body 41 and an elastic member 42. The body 41 is a rectangular block structure, and the body 41 is provided with an accommodating groove 411 extending along the stacking direction of the cells 2. Two opposite groove walls of the accommodating groove 411 are provided with a limiting guiding groove 412 extending along the stacking direction of the cells 2. In FIG. 8, the limiting guiding groove 412 is disposed on the two opposite groove walls of the accommodating groove 411. The second connecting portion 50 includes a fixed portion 51 and a limiting guiding member 52. The limiting guiding member 52 is connected to the fixed portion 51, and the limiting guiding member 52 is slidably disposed on the body 41 along the stacking direction of the cells 2. Two ends of the elastic member 42 are respectively connected to the body 41 and the limiting guiding member 52, thereby implementing the elastic connection between the first connecting portion 40 and the second connecting portion 50. In FIG. 8, the fixed portion 51 is integrally formed on an end portion of the second cable tie 5 and has a connecting structure with a mounting hole. A hole axis of the mounting hole on the fixed portion 511 extends along a vertical direction. The limiting guiding member 52 is inserted into the mounting hole of the fixed portion 51, and two ends of the limiting guiding member 52 are respectively slidably matched with the two limiting guiding grooves 412 disposed up and down. The elastic member 42 is stretched and connected between the body 41 and the limiting guiding member 52. The elastic member 42 is accommodated in the accommodating groove 411, one end of the elastic member 42 is connected to a side wall of the accommodating groove 411 away from the second cable tie 5, and the other end of the elastic member 42 is connected to the limiting guiding member 52. Further, multiple elastic members 42 are disposed in parallel at intervals along an extension direction of the limiting guiding member 52, that is, the body 41 and the limiting guiding member 52 are elastically connected through the elastic members 42 disposed in parallel, which can ensure the pre-tightening force of the cable tie 3 on the movable plate 13a, and can also ensure that after the swelling force of the cell 2 disappears, the cable tie 3 can drive the movable plate 13a to smoothly return to the original position and maintain the overall pre-tightening of the cell 2.

In the above embodiment, the connection between the elastic member 42 and the body 41 may adopt the following manner. The side wall of the accommodating groove 411 of the body 41 away from the second cable tie 5 is provided with a hook, and a hanging hole structure at an end portion of the elastic member 42 is then hooked onto the hook. The connection between the elastic member 42 and the limiting guiding member 52 may adopt the following manner. The hanging hole structure at the end portion of the elastic member 42 is aligned with the mounting hole of the fixed portion 51, the limiting guiding member 52 is then sequentially passed through the mounting hole of the fixed portion 51 and the hanging hole structure of the elastic member 42, and the limiting guiding member 52 is eventually mounted matching with the limiting guiding groove 412. In addition, in order to prevent the limiting guiding member 52 from being separated from the limiting guiding groove 412, after the limiting guiding member 52 is mounted matching with the limiting guiding groove 412, limiting blocks may be added at the two ends of the limiting guiding member 52 or the two ends of the limiting guiding member 52 may be riveted to form the limiting blocks. The configuration manner of the limiting blocks is not limited to the above two examples and will not be illustrated one by one here.

Figure 9:
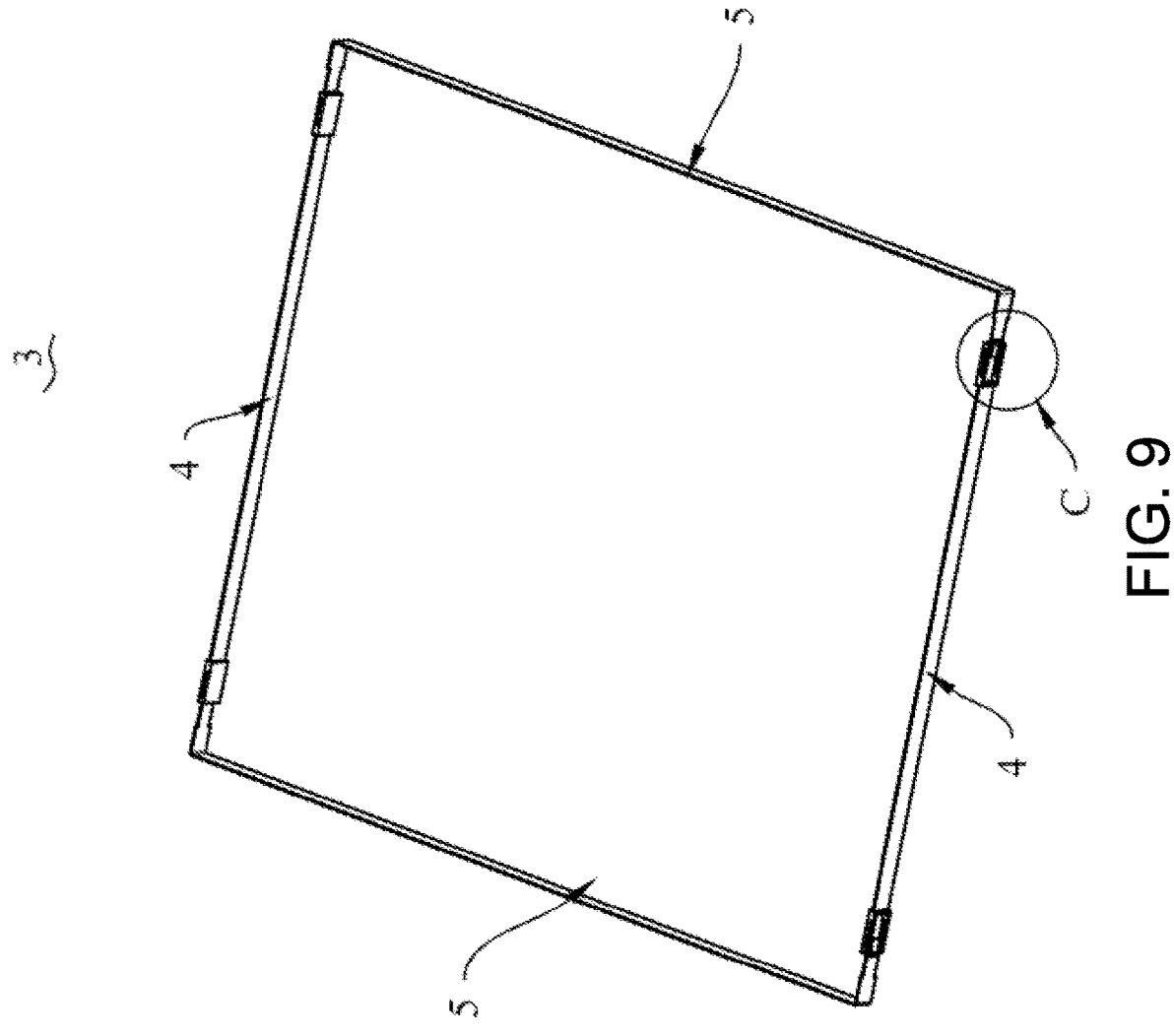
FIG. 9 is a schematic structural view of a third cable tie according to an embodiment of the disclosure.
Figure 10:
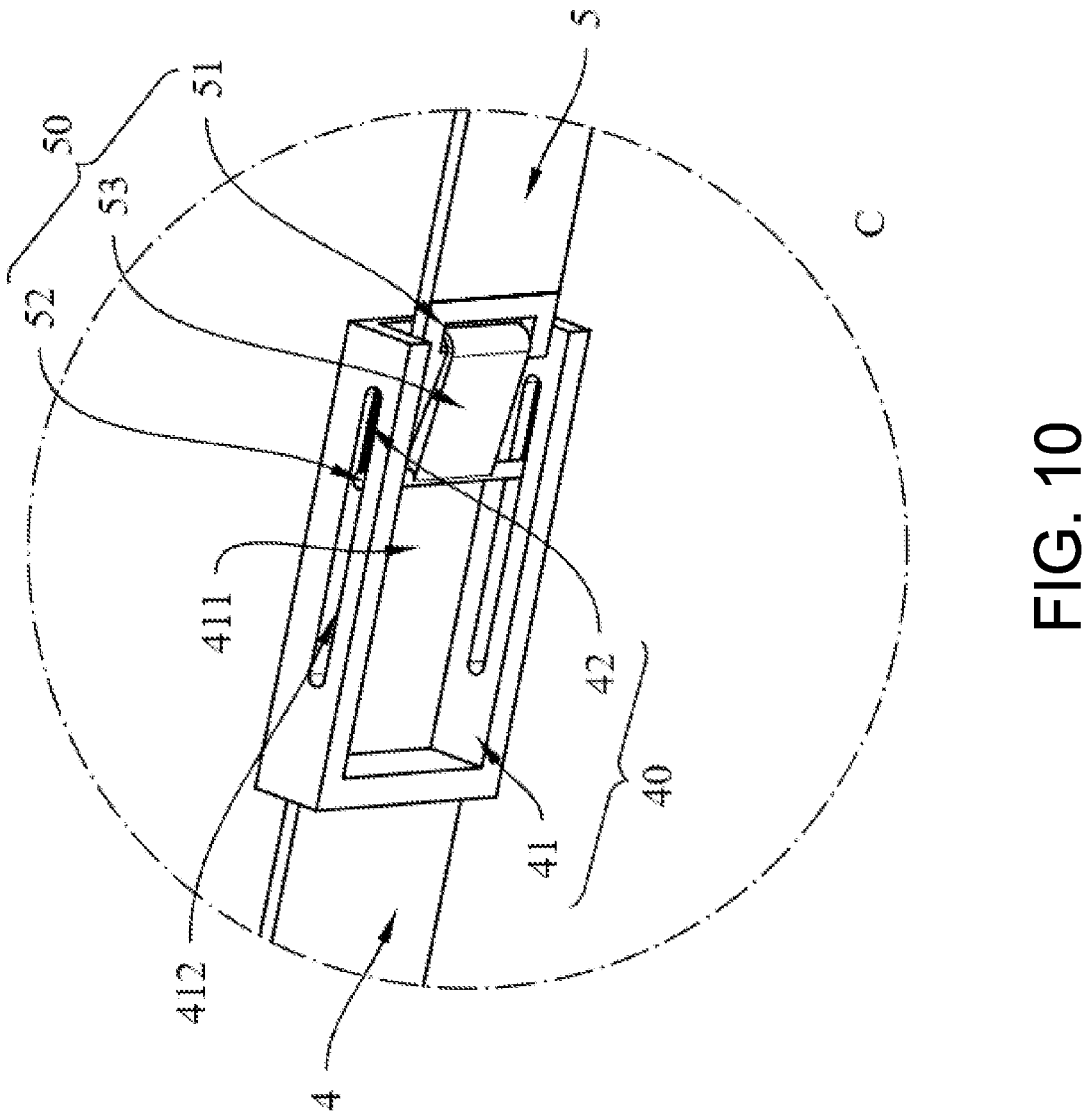
FIG. 10 is an enlarged view at C in FIG. 9.

FIG. 9 and FIG. 10 show a third example of the basic structure of the cable tie 3. As shown in FIG. 9 and FIG. 10, the cable tie 3 includes the first cable tie 4 and the second cable tie 5. The two ends of the first cable tie 4 are provided with the first connecting portion 40, and the two ends of the second cable tie 5 are provided with the second connecting portion 50. The two first cable ties 4 and the two second cable ties 5 are alternately connected and surround the peripheral side of the side wall. In another embodiment, in the cable tie 3, the number of the first cable tie 4 and the second cable tie 5 is at least two, and the first cable tie 4 and the second cable tie 5 are alternately connected and surround the peripheral side of the side wall. The first connecting portion 40 of the first cable tie 4 is elastically connected to the second connecting portion 50 of the second cable tie 5. When the cell 2 does not swell, the first cable tie 4 and the second cable tie 5 can generate a supporting force for positioning on the movable plate 13a. When the cell 2 swells to move the movable plate 13a, the first cable tie 4 and the second cable tie 5 can exert a restraining force on the movable plate 13a to obstruct continuous sliding, so as to ensure that the movable plate 13a is eventually abutted with the upper cover 12, the base plate 11, and other side walls and does not slip off.

Continuing as shown in FIG. 10, the first connecting portion 40 includes the body 41 and the elastic member 42. The body 41 is a rectangular block structure, and the body 41 is provided with the accommodating groove 411 extending along the stacking direction of the cells 2. The two opposite groove walls of the accommodating grooves 411 are provided with the limiting guiding groove 412 extending along the stacking direction of the cells 2. In FIG. 10, the limiting guiding groove 412 is disposed on the two opposite groove walls of the accommodating groove 411. The second connecting portion 50 includes the fixed portion 51, the limiting guiding member 52, and a connecting member 53. The fixed portion 51 is connected to a tie-shaped portion of the second cable tie 5. One end of the connecting member 53 is connected to the fixed portion 51, and the other end is connected to the limiting guiding member 52. The limiting guiding member 52 is slidably disposed on the body 41 along the stacking direction of the cells 2. The two ends of the elastic member 42 are respectively connected to the body 41 and the limiting guiding member 52, thereby implementing the elastic connection between the first connecting portion 40 and the second connecting portion 50. In FIG. 10, the fixed portion 51 is integrally formed on the end portion of the second cable tie 5 and has a connecting structure with a mounting hole. A hole axis of the mounting hole on the fixed portion 511 extends along a direction perpendicular to a surface where the cable tie 3 is at. One end of the connecting member 53 is hooked to the mounting hole of the fixed portion 51, and the other end is fixedly connected to the limiting guiding member 52. The elastic member 42 is compressed and connected between the body 41 and the limiting guiding member 52. The elastic member 42 is accommodated in the limiting guiding groove 412, one end of the elastic member 42 is connected to the side wall of the limiting guiding groove 412 close to the second cable tie 5, and the other end of the elastic member 42 is connected to the limiting guiding member 52. At least one elastic member 42 is disposed in each limiting guiding groove 412, the elastic member 42 is compressed, and the elastic force of the elastic member 42 on the limiting guiding member 52 enables the second cable tie 5 to generate a pre-tightening force on the movable plate 13a. When the cell 2 swells to push the movable plate 13a to move, the elastic member 42 is further compressed. After the swelling force of the cell 2 disappears, the first cable tie 4 and the second cable tie 5 can be contracted under the action of the elastic member 42, thereby restoring the movable plate 13a to the original position, so as to maintain the overall pre-tightening of the cell 2.

The connection between the elastic member 42 and the body 41 may adopt the following manner. The side wall of the limiting guiding groove 412 of the body 41 close to the second cable tie 5 is provided with a hook or a limiting groove, and a hanging hole structure at the end portion of the elastic member 42 is then hooked to the hook or the end portion of the elastic member 42 is accommodated in the limiting groove. The connection between the elastic member 42 and the limiting guiding member 52 may adopt the following manner. The limiting guiding member 52 is passed through the hanging hole structure of the elastic member 42. In addition, in order to prevent the limiting guiding member 52 from being separated from the limiting guiding groove 412, after the limiting guiding member 52 is mounted matching with the limiting guiding groove 412, limiting blocks may be added at the two ends of the limiting guiding member 52 or the two ends of the limiting guiding member 52 may be riveted to form the limiting blocks. The configuration manner of the limiting blocks is not limited to the above two examples and will not be illustrated one by one here.

The embodiment also provides an electronic device (not shown in the drawing), which includes the battery module. Through the electronic device applying the battery module, the swelling force of the cell 2 on the side plate 13 can be effectively reduced, which can prevent the side plate 13 from being damaged due to the swelling of the cell 2 to improve the safety of the battery module, so as to ensure the safety of the electronic device.

The electronic device may be an electric vehicle or other equipment capable of installing the battery module according to the embodiment of the disclosure.

Note that the above are only preferred embodiments and applied technical principles of the disclosure. Persons skilled in the art will understand that the disclosure is not limited to the specific embodiments described herein, and various obvious changes, readjustments, and substitutions may be made by persons skilled in the art without departing from the protection scope of the disclosure. Therefore, although the disclosure has been described in detail through the above embodiments, the disclosure is not limited to the above embodiments and may also include more other equivalent embodiments without departing from the concept of the disclosure. The scope of the disclosure is determined by the scope of the appended claims.

What is claimed is:

1. A battery module, comprising:

a case, comprising a base plate, an upper cover, and a side wall;

a plurality of cells, wherein the cells are stacked in the case along a thickness direction, wherein the side wall is formed by enclosing a plurality of side plates, and the side plates comprise at least one movable plate capable of sliding along a stacking direction of the cells, wherein two side plates adjacent left and right to the movable plate are fixed plates, and the fixed plates are fixedly connected to the base plate and the upper cover, the fixed plate is provided with an escape groove; and a cable tie, passing through a rectangular opening of the escape groove, so that the cable tie slides in the escape groove along with a deformation and/or a displacement thereof, wherein the rectangular opening is close to the end of the fixed plate and penetrating the fixed plate.

2. The battery module according to claim 1, wherein the cable tie is disposed to be at least elastically attached to an outer surface of the movable plate and a part of the two side plates adjacent left and right to the movable plate.

3. The battery module according to claim 2, wherein two ends of the cable tie are respectively provided with connecting portions, and the connecting portions of a plurality of the cable ties are connected two by two and/or are fixed to the two side plates adjacent left and right to the movable plate.

4. The battery module according to claim 3, wherein the fixed plate is provided with a recess for the connecting portion to be embedded.

5. The battery module according to claim 1, wherein the case further comprises a sliding track and a sliding groove, the sliding groove is disposed on the movable plate, and the sliding track is disposed on the base plate and/or the upper cover.

6. The battery module according to claim 5, wherein the sliding track is a strip-shaped protrusion extending along the stacking direction of the cells, and the sliding groove is a notch structure matching with the strip-shaped protrusion of the sliding track.

7. The battery module according to claim 5, wherein an extension length of the sliding track is equal to or more than a swelling amount of the cell in the thickness direction.

8. The battery module according to claim 5, wherein a width of the base plate is L, and a length of the sliding track is x, then x/L<0.15.

9. An electronic device, comprising the battery module according to claim 1.

* * * * *